(12) United States Patent
Kadri

(10) Patent No.: US 10,108,253 B2
(45) Date of Patent: Oct. 23, 2018

(54) MULTIPLE COMPUTE NODES

(71) Applicant: HEWLETT PACKARD ENTERPRISE DEVELOPMENT LP, Houston, TX (US)

(72) Inventor: Rachid M. Kadri, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 95 days.

(21) Appl. No.: 15/114,004

(22) PCT Filed: Jan. 30, 2014

(86) PCT No.: PCT/US2014/013816
§ 371 (c)(1),
(2) Date: Jul. 25, 2016

(87) PCT Pub. No.: WO2015/116096
PCT Pub. Date: Aug. 6, 2015

(65) Prior Publication Data
US 2016/0349834 A1 Dec. 1, 2016

(51) Int. Cl.
*G06F 1/26* (2006.01)
*G06F 1/32* (2006.01)
*G06F 1/30* (2006.01)

(52) U.S. Cl.
CPC ............. *G06F 1/3296* (2013.01); *G06F 1/26* (2013.01); *G06F 1/266* (2013.01); *G06F 1/30* (2013.01)

(58) Field of Classification Search
CPC ............................ G06F 11/2023; G06F 1/266
See application file for complete search history.

(56) References Cited

U.S. PATENT DOCUMENTS

| | | |
|---|---|---|
| 2004/0255172 A1 | 12/2004 | Dayan et al. |
| 2004/0255185 A1 | 12/2004 | Fujiyama et al. |
| 2008/0162878 A1 | 7/2008 | Zimmer et al. |
| 2011/0102996 A1 | 5/2011 | Janick et al. |
| 2011/0138387 A1 | 6/2011 | Ahn et al. |
| 2011/0169522 A1 | 7/2011 | Raj et al. |

(Continued)

FOREIGN PATENT DOCUMENTS

WO WO-2003-042829 A2 5/2003
WO WO-2012123061 9/2012

OTHER PUBLICATIONS

Aggarwal, N. et al.; "Motivating Commodity Multi-core Processor Design for System-level Error Protection"; Mar. 23, 2007; 6 pages.

(Continued)

*Primary Examiner* — Albert Wang
(74) *Attorney, Agent, or Firm* — Dhand Law PC

(57) ABSTRACT

An example apparatus comprises a first compute node including a first processor; a second compute node including a second processor; an input/manta (I/O) interface to selectively couple the first and second compute nodes to a set of I/O resources; and a voltage regulator including a set of power phase circuits, the voltage regulator to operate in a fault tolerant mode to provide power from selected ones of a first portion of the set of power phase circuits to the first compute node and to provide power from selected ones of a second portion of the set of power phase circuits to the second compute node.

16 Claims, 4 Drawing Sheets

(56) References Cited

U.S. PATENT DOCUMENTS

| | | | |
|---|---|---|---|
| 2011/0184579 A1* | 7/2011 | Nilsen | H02J 3/14 700/295 |
| 2013/0042096 A1 | 2/2013 | Housty | |
| 2015/0094868 A1* | 4/2015 | Diab | G05B 19/4185 700/286 |
| 2015/0178092 A1* | 6/2015 | Mishra | G06F 15/163 712/29 |

OTHER PUBLICATIONS

Armando Acosta et al.; "Dell PowerEdge 11th Generation Servers: R810, R910, and M910 Memory Guidance"; Mar. 23, 2010; 19 pages.
The International Search Report and the Written Opinion of the International Searching Authority, dated Jul. 15, 2015; International Application No. PCT/US2014/013816; 14 pages.

* cited by examiner

MULTIPLE COMPUTE NODES

BACKGROUND

Today's multi-core sockets offer a solution where many cores can be tied to a memory controller. As an example, in a multi-core implementation, there is only one bus connected to a South Bridge (an input/output or I/O interface), and its information is provided to the core that boots first. Fault tolerant means that if an information path fails, then another one can be used that keeps the system working. Fault tolerance is not currently available at the multi-core socket or its system implementation. Furthermore since fault tolerant servers are expensive systems, there is a lack of this feature in the Industry Standard Server (ISS) which is the bulk of the server industry.

BRIEF DESCRIPTION OF THE DRAWINGS

For a more complete understanding of various examples, reference is now made to the following description taken in connection with the accompanying drawings in which.

DETAILED DESCRIPTION

Figure 1:
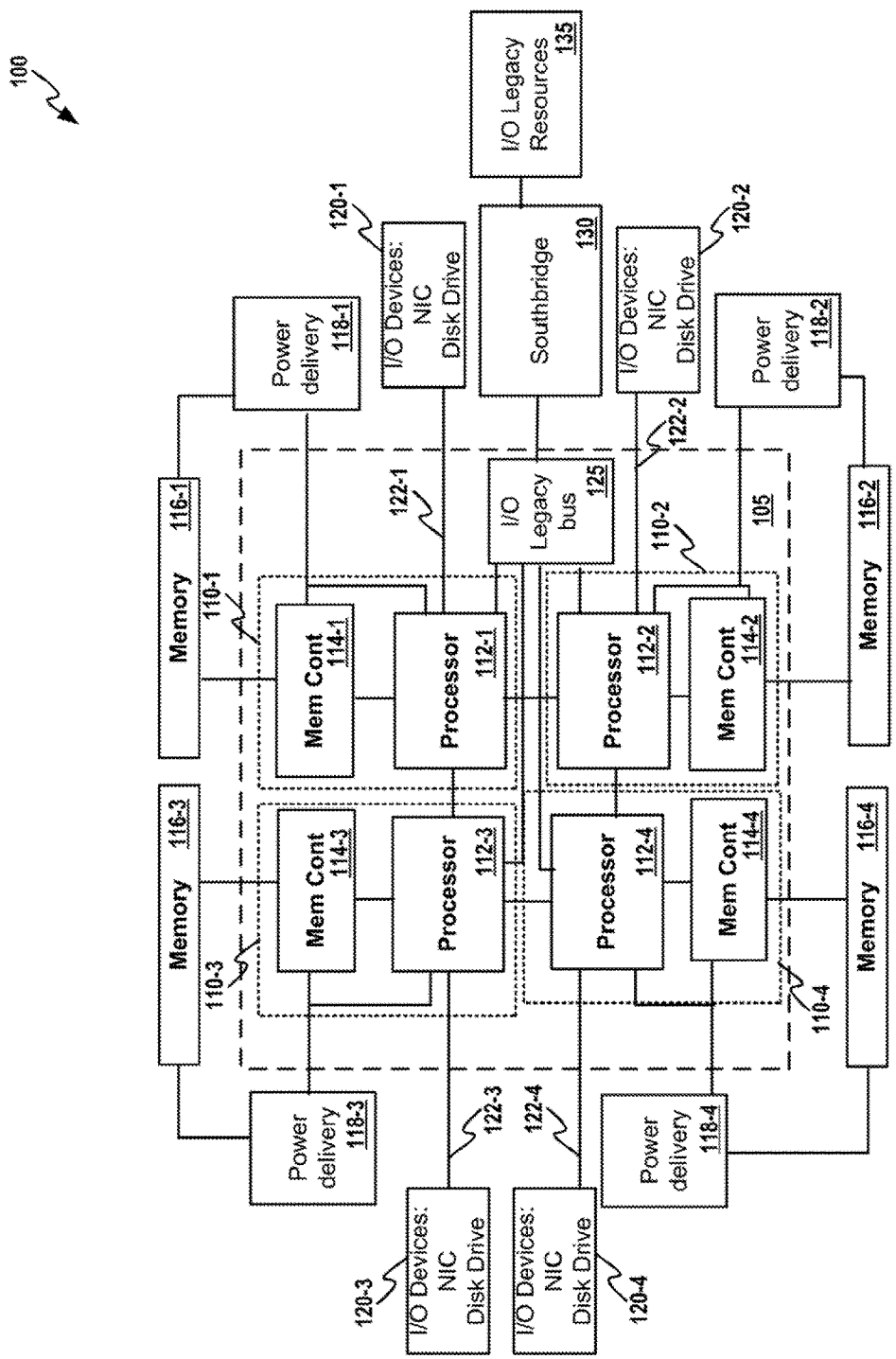
FIG. 1 illustrates an example multi-node computer.

As used herein, a core may include a logical execution unit able to independently execute programs or threads. A socket may refer to a physical connector on a computer motherboard that accepts a physical chip. Many motherboards can have multiple sockets that can, in turn, accept multi-core chips. A processor may be a single execution core or a single physical multi-core chip. A compute node may include a processor with a number of execution units or cores, and each core may be able to run multiple independent processes simultaneously.

Example systems and apparatus described herein may include a multi-node computing component integrating multiple independent compute nodes. Each compute node may include a memory controller and a processor. Each compute node may include its own individual connections to external I/O (input/output) devices and memory. The multi-node computing component may offer fault tolerance at the system level at an attractive cost that has not been afforded by prior-art systems. A fault tolerant system, as described herein, may provide power redundancy for the entire system at the compute node, input/output (I/O) interface (e.g., a Southbridge integrated circuit implementing slower capabilities of a computer such as legacy resources including, for example, Basic Input-Output System (BIOS), external bus interfaces, etc.) and voltage regulator levels. In order to provide compute nodes that are independent of each other within one multi-node computing component, a new multi-mode Southbridge, a new voltage regulator, and a new set of external logic are described herein.

The current technology that saw the proliferation of multi-core sockets can be modified to design a new class of multi-node components where, instead of cores, complete nodes, each comprising a processor and memory controller, can be integrated along with respective connections to external buses for I/O interface. This new multi-node component may utilize independent compute nodes each with a processor and memory controller, and a system controller to provide for fault tolerance at the system level including compute nodes, Southbridge and voltage regulators.

The standalone compute nodes may be used to address the emergence of a new class of servers providing applications that multi-core sockets are not suited for, and the system level fault tolerance may address a new market segment that does not yet exist: low cost fault tolerant servers. Only expensive complex hardware designs can currently achieve system level fault tolerance. However, using examples described herein, a similar level of fault tolerance can be reached without the need for external complex hardware.

A segment of the server market is seeing the resurgence of small standalone Single Board Computers (SBCs) composed of a processor, memory, legacy I/O interface (Keyboard, Video, Mouse, . . . ), and I/O devices such as a Hard Disk Drive (HDD) and a Network Interface Controller (NIC). These standalone SBCs are referred to as micro servers due to their small size and low power usage. Micro servers may serve as a replacement for multi-core sockets due to demand for low power computing nodes and targeting specific applications where multi-core sockets are not well suited due to their high power usage and cost.

By designing an architecture in such a way that allocates a memory controller per processor and reassigning the internal and external links to dedicated I/O for each node then it is feasible to integrate, in one component, complete computing units each accessing dedicated external devices such as NIC and HDD, and each linked to a new Southbridge that services multiple compute nodes to access I/O legacy resources.

FIG. 1 illustrates an example multi-node computer 100. The example multi-node computer 100 of FIG. 1 may include a multi-node computing component 105 including multiple compute nodes 110, each compute node 110 may include a processor 112 and a memory controller 114. In the example shown in FIG. 1, the multi-node computing component 105 has four compute nodes 110 including a first compute node 110-1 with a first processor 112-1 and a first memory controller 114-1, a second compute node 110-2 with a second processor 112-2 and a second memory controller 112-2, a third compute node 110-3 with a third processor 112-3 and a third memory controller 114-3, and a fourth compute node 110-4 with a fourth processor 112-4 and a fourth memory controller 114-4.

In various examples, the multi-node computing component 105 may be architected by allocating independent I/O busses 122 coupling each processor 112 to independent I/O devices 120, and independent memory 116 coupled to each memory controller 114. In FIG. 1, for example, a first I/O bus 122-1 couples the first processor 112-1 to first I/O devices (e.g., an NIC and disk drive) 120-1, a second I/O bus 122-2 couples the second processor 112-2 to second I/O devices (e.g., NIC and disk drive) 120-2, a third I/O bus 122-3 couples the third processor 112-3 to third I/O devices (e.g., an NIC and disk drive) 120-3, and a fourth I/O bus 122-4 couples the fourth processor 112-4 to fourth I/O devices (e.g., an NIC and disk drive) 120-4. The first, second, third and fourth memory controllers 114-1 to 114-4 are coupled, respectively, to a first memory 116-1, a second memory 116-2, a third memory 116-3 and a fourth memory 116-4.

The architecture of the multi-node computer 100 of FIG. 1 may effectively allow every compute node 110 to access its own external I/O devices 120 independently of the other compute nodes 110 and its own memory 116. In addition, each processor 112 may be coupled, via an independent path, to an I/O legacy bus 125 and an I/O interface such as a Southbridge 130 that is in turn coupled to I/O legacy resources 135. The Southbridge 130 may be configured such that, each compute node 110 has its own independent path to access the I/O legacy resources 135 such as, for example, BIOS firmware for booting, as well as other functions such as Video, Keyboard, Mouse, etc. The Southbridge 130 is merely an example of an I/O interface, but other forms of I/O interface may also be used.

Each processor 112, memory controller 114 and memory 116 may be powered by an individual power delivery component 118. As shown in the example of FIG. 1, a first power delivery component 118-1 powers the first processor 112-1, the first memory controller 114-1 and the first memory 116-1, a second power delivery component 118-1 powers the second processor 112-2, the second memory controller 114-2 and the second memory 116-2, a third power delivery component 118-3 powers the third processor 112-3, the third memory controller 114-3 and the third memory 116-3, and a fourth power delivery component 118-4 powers the fourth processor 112-4, the fourth memory controller 114-4 and the fourth memory 116-4. The power delivery components 118 may be part of one or more voltage regulators configured as described below.

Figure 3:
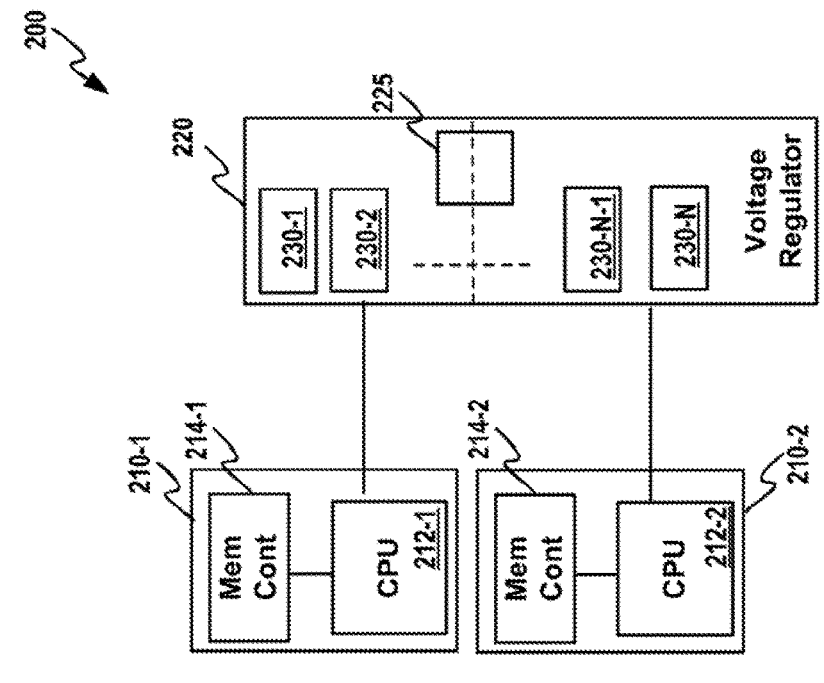
FIG. 3 illustrates another example dual-node computing component.
Figure 2:
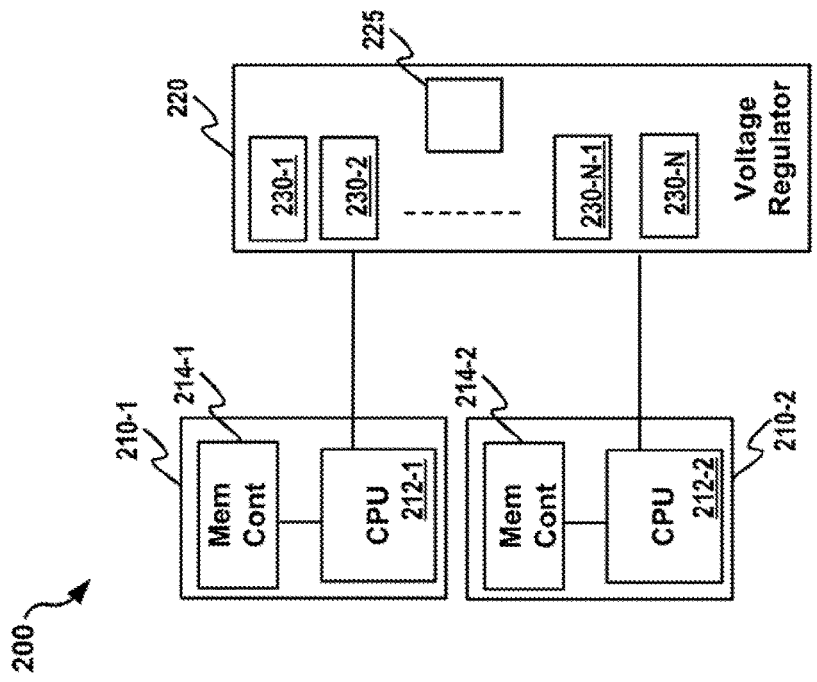
FIG. 2 illustrates an example dual-node computing component.

Referring now to FIGS. 2 and 3, an example dual node computing component 200 may include a voltage regulator 220 configured to operate in a first mode as illustrated in FIG. 2, and to operate in a second mode as illustrated in FIG. 3. In the example dual-node component 200 operating in the first mode, as Shown in FIG. 2, the single voltage regulator 220 can be used to power both a first computing node 210-1, including a first processor (e.g., a central processing unit or CPU) 212-1 and a first memory controller 214-1, and a second computing node 210-2, including a second processor (e.g., a central processing unit or CPU) 212-2 and a second memory controller 214-2 when the system is operating in a normal or fault tolerant mode. In this first mode, an entire set of "N" power phase circuits 230, including a first power phase circuit 230-1, a second power phase circuit 230-2, an "N–1th" power phase circuit 230-N–1 and an "Nth" power phase circuit 230-N are used to incrementally increase power to both compute nodes 210 as increased power is needed.

However, by configuring the power pins of the first computing node 210-1 to be separate from the power pins of the second computing node 210-2, the voltage regulator 220 may operate in the second mode, as illustrated in FIG. 3, where a first portion (e.g., a first half) of the power phase circuits 230, including 230-1 and 230-2 in this example, power the first compute node 210-1, while a second portion (e.g., a second half) of the power phase circuits 230, including 230-N–1 and 230-N in this example, power the second compute node 210-2. In the second mode of operation, the voltage regulator 220 may provide fault tolerance to the dual node computing component 200.

Effectively, separating the power pins of the first compute node 210-1 from the power pins of the second compute node 210-2 allows the two compute nodes 210-1 and 210-2 to operate in a redundant mode when configured as such. A voltage regulator controller 225 may be configured to switch between the first operating mode of FIG. 2 and the second operating mode of FIG. 3. Thus by combining the separate power pin architecture of the compute nodes 210 and the split phase mode (the second mode) of the voltage regulator controller 225 of the dual node computing component 200, with a multi-ported South Bridge, such as the Southbridge 130 of FIG. 1, a multi-node computer 100 provides a fault tolerant server that has not been defined yet for the Industry Standard Server (ISS).

The voltage regulator controller 225 may be designed to operate in both the first and second modes. In the first mode, as illustrated in FIG. 2, the voltage regulator controller 225 controls the power phase circuits 230 to all be synchronized together to power both the first compute node 210-1 and the second compute node 210-2. In the second mode, the voltage regulator controller 225 controls the first half of the power phase circuits 230 to power the first compute node 210-1, and controls the second half of the power phase circuits to power the second compute node 210-2. In the second mode, if one of the first or second compute nodes 210-1 and 210-2 fails, then the failed compute node 210 is isolated from the non-ailed compute node 210, and half the power phase circuits 230 corresponding to the failed compute node 210 are shut down, thereby allowing the other half of the power phase circuits 230 to keep powering the non-failed compute node 210. Conversely, if one or more of the power phase circuits 230 in the first or second half fail, then the voltage regulator controller 225 could shut down the failed power phase circuit or the entire half of power phase circuits 230 that the failed power phase circuit is a part of while the compute node 210 associated with the failed power phase circuits 210 is also shut down. In this way, the non-failed half of power phase circuits 230 would continue to power the compute node 210 associated with the non-failed power phase circuits 230.

The system level fault tolerance afforded by the dual mode computing component 200 operating in the second mode, as illustrated in FIG. 3, cannot be implemented using a multi-core socket due to architectural restrictions of the multi-core socket. Furthermore this solution would be very costly if implemented using currently designed industry standard servers. Indeed, current fault tolerant servers are reserved to expensive systems because they require duplicate hardware systems and only few customers that demand reliable systems can afford them. The multimode dual node computing component 200 on the other hand can bring fault tolerance at the system level that is cost acceptable as an industry standard server.

Figure 4:
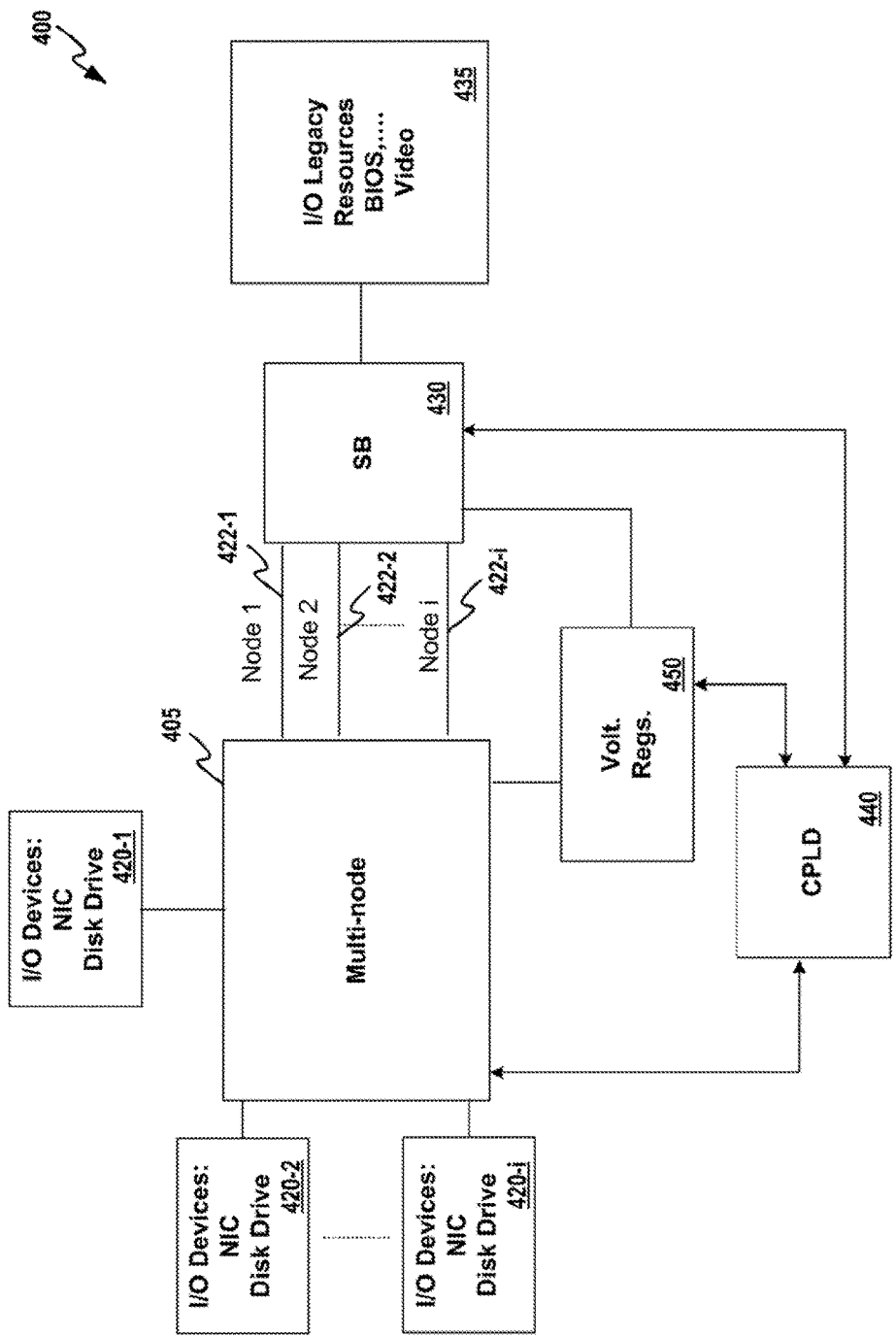
FIG. 4 illustrates another example multi-node computer.

However, in order to make a complete fault tolerant system, such as in the multi-node computer 100 of FIG. 1, the Southbridge 130 may also be configured to provide an independent path for each compute node 110 to access the I/O legacy resources 135 such as BIOS for booting, video, keyboard, mouse, etc. In addition, in some examples, redundancy may also be applied to the Southbridge 135 circuitry as well where each path for each compute node 110 coupling the Southbridge 130 to the I/O Legacy resources 135 may be logically isolated as to not affect the overall functionality of the Southbridge 130 in case of failure. In order to keep each compute node path separate from any other, in case of failure, the Southbridge 130 may also integrate some type of separate power pins like the compute nodes 210 of the dual node computing component 200 of FIG. 2. FIG. 4 shows an example of a fault tolerant multi-node computer system 400 providing fault tolerance at the processor, I/O device and Southbridge levels.

Referring, now to FIG. 4, a multi-node computer system 400 includes a multi-node component 405 that includes "i" compute nodes (not shown). For example, the multi-node component 405 may include the four compute nodes 110 of the multi-node computer 100 of FIG. 1, or the two compute nodes 210 of the dual mode computer 200 of FIGS. 2 and 3. Each of the compute nodes of the multi-node component 405 may be coupled to independent I/O devices 420 of which FIG. 4 illustrates first I/O devices 420-1, second I/O devices 420-2 and "ith" I/O devices 420-i.

A Southbridge 430 is coupled via independent first, and second through "ith" I/O busses 422-1, 422-2 and 422-i, to each of the "i" compute nodes of the multi-node component 405. Control logic of the Southbridge 430 couples the input/output signals from and to the I/O legacy devices 435 and may provide for both a normal operating mode (such as the first mode of FIG. 2) and/or a fault tolerant operating mode (such as the second mode of FIG. 3).

The multi-node computer system 400 may also include one or more voltage regulators 450. The voltage regulators 450 may include, for example, one or more of the voltage regulators 220 of FIG. 2 to provide the first, second, third and fourth power delivery components of FIG. 1.

The multi-node computer system 400 may also include a system controller 440, which may be implemented in a complex programmable logic device (CPLD) as illustrated in FIG. 4. The system controller 440 may be coupled to the multi-node component 405, the Southbridge 430 and the voltage regulator(s) 450. In FIG. 4, the lines with double arrows indicate that control and status information signals may be transferred to and from the system controller 440, the multi-node component 405, the Southbridge 430 and the voltage regulator(s) 450. The control and status information signals may be used to implement the fault tolerant system control processes described below.

The system controller 440 may include logic and/or circuitry to replicate the voltage regulator controller 225 of FIGS. 2 and 3 or, alternatively, the system controller 440 may communicate signals to and from the voltage regulator controller 225 of the voltage regulator(s) 450. Similarly, the system controller 440 may include control of the fault tolerant logic of the Southbridge 430 to selectively couple the I/O legacy resources 435 to the compute nodes of the multi-node component 405.

Figure 5:
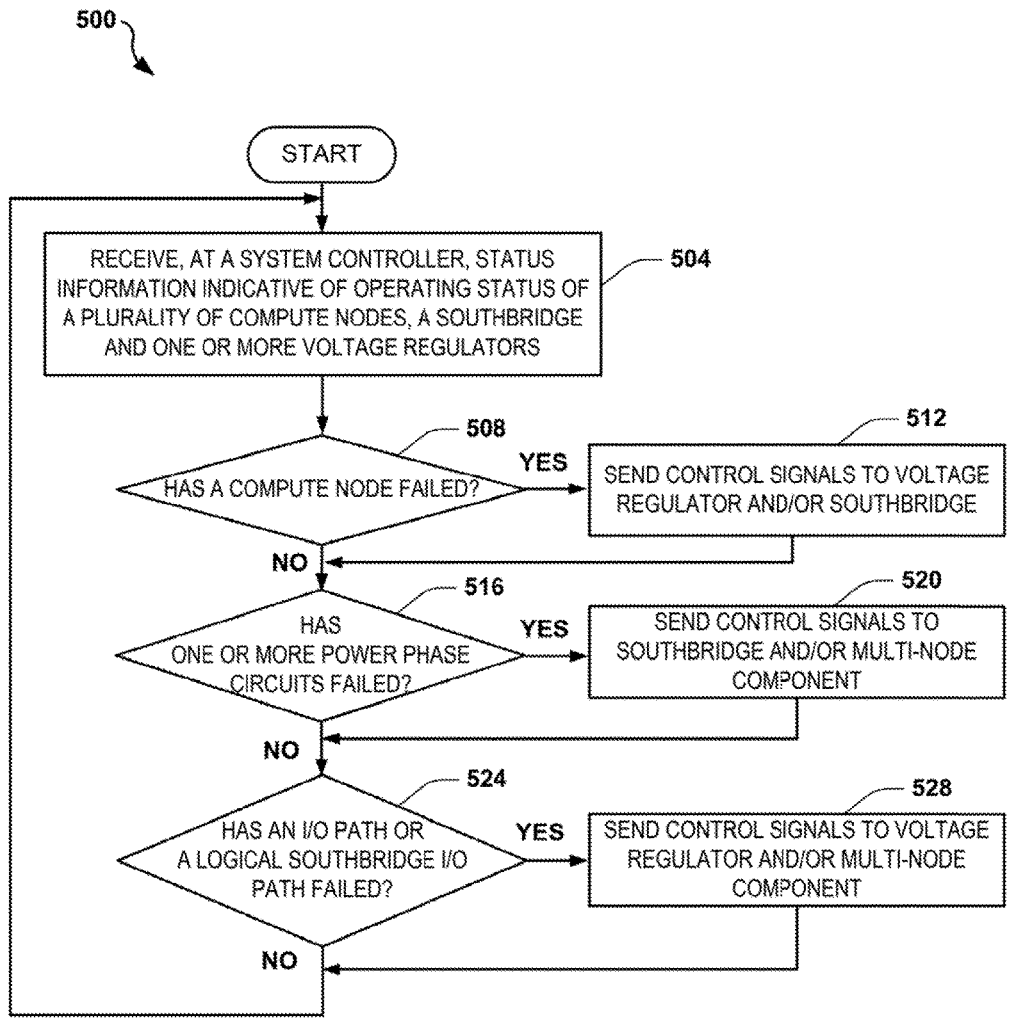
FIG. 5 illustrates an example process for providing system-level fault tolerance to a multi-node computer.

FIG. 5 illustrates an example process 500 for providing system level fault tolerance to a multi-node computer, for example, as described above with reference to FIGS. 2, 3 and 4. In various examples, the process 300 may be performed, at least in part, by the example multi-node computer systems 100 and 400 of FIGS. 1 and 4. The process 500 will be described in further reference to FIGS. 1 and 4.

In the example illustrated in FIG. 5, the process 500 may begin at with the system controller 440 receiving signals containing status information indicative of operating status of the plurality of compute nodes of the multi-node computing component 405 (block 504). For the example multi-node computer 100 of FIG. 1, the system controller 440 may receive indications of whether one or more of the compute nodes 110-1 to 110-4 is failed, non-failed or partially failed. The operating status signals may also indicate what portion of which compute node or which I/O device of the I/O devices 420 is failed.

At block 504, the system controller 440 may also receive status information indicative of operating states of the voltage regulator 450 and/or the Southbridge (I/O interface) 430. For example, the operating status information for the voltage regulator 450 may indicate which one or ones of a plurality of power phase circuits is failed or partially failed. Further, the operating status information for the Southbridge 430 may indicate that an I/O path 422 associated with one of the compute nodes of the multi-node component 405, or a logical path within the Southbridge 430, is failed.

Upon receiving the signals indicative of the operating states at block 504, the system controller 440 may determine whether one of the compute nodes is in a failed state, or in a partially failed state in some example systems (decision block 508). If it is determined that one of the compute nodes is in a failed, or at least a partially failed state, the system controller 440 may send one or more control signals to the voltage regulator 450 and/or the Southbridge 430 (block 512). A control signal sent to the Southbridge 430 may control the Southbridge 430 to decouple the I/O legacy resources 435 from the compute node, or nodes, which were indicated to be in a failed or partially failed state. Alternatively, a control signal sent to the voltage regulator 530 may control the voltage regulator 450 to cutoff power being supplied to the compute node, or nodes, that were indicated to be in a failed or partially failed state. In some examples, the system controller 440 may also send a control signal to the multi-node computing component 405 controlling the multi-node computing component 405 to disable the failed compute node or to disable or uncouple I/O devices 420 associated with the failed compute node.

Subsequent to sending the control signals at block 512, or if it is determined at decision block 508 that none of the compute nodes is in a failed or partially failed state, the system controller 440 determines if one or more power phase circuits of the voltage regulator 450 has failed (decision block 516). If it is determined that one or more of the power phase circuits is in a failed state, the system controller 440 may send one or more control signals to the Southbridge 430 and/or the multi-node computing component 405 (block 520). A control signal sent to the Southbridge 430 may control the Southbridge 430 to decouple the I/O legacy resources 435 from the compute node, or nodes, that the failed power phase circuit was powering. Alternatively, a control signal sent to the multi-node computing component 405 may control the multi-node computing component to disable the compute node that was being powered by the failed power phase circuit. In some examples, the system controller may also send a control signal to the voltage regulator 450 controlling the voltage regulator 450 to disable the failed power phase circuit or to power one of the compute nodes only with the other power phase circuits in the portion of power phase circuits associated with the one compute node that the failed power phase circuit was powering before failing.

Subsequent to sending the control signals at block 520, or if it is determined at decision block 516 that none of the power phase circuits is failed, the system controller 440 determines if one or more I/O paths 422, or one of the logical I/O paths within the Southbridge 430, has failed (decision block 524). If it is determined that one or more I/O paths 422, or one or more of the logical I/O paths within the Southbridge 430 is in a failed state, the system controller 440 sends one or more control signals to the voltage regulator 450 and/or the multi-node computing component 405 (block 528). A control signal sent to the multi-node computing component 405 may control the multi-node computing component 405 to disable the compute node that was being coupled to the I/O legacy resources via the failed I/O path. A control signal sent to the voltage regulator 530 may control the voltage regulator 450 to cutoff power being supplied to the compute node that was being coupled to the I/O legacy resources via the failed I/O path. In some examples, the system controller 440 may also send a control signal to the Southbridge 430 controlling the Southbridge 430 to discontinue use of logical paths within the Southbridge 430 that are associated with the failed I/O path 422 or the failed logical path.

Subsequent to sending the control signals at block 528, or if it is determined at decision block 524 that none of the I/O paths is failed, the system controller 440 continues to receive status signals indicative of the operating states of the compute nodes, the Southbridge 430 and/or the voltage regulator 450 (block 504).

The process 500 illustrated in FIG. 5 is an example only and not limiting. In various examples, the process 500 may be altered, for example, by having steps or blocks added, removed, rearranged, combined, and/or performed concurrently.

Advantages afforded by the apparatus and methods described above include a possible reduction of external hardware interface logic, a decrease in a number of components when compared to the current implementation of one micro server, more SBCs within the same enclosure space, simplification of system controller logic, and a reduction in a number of connectors to a main backplane of a server.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above described examples, these descriptions should not be viewed in a limiting sense. Rather, there are several variations and modifications which may be made without departing from the scope as defined in the appended claims.

What is claimed is:

1. An apparatus, comprising:
a first compute node including a first processor;
a second compute node including a second processor;
an input/output (I/O) interface to selectively couple the first compute node and the second compute node to at least one I/O resource;
a voltage regulator including a plurality of power phase circuits to selectively provide power to the first compute node and the second compute node; and
a controller to:
receive signals indicative of an operating status of the first and second compute nodes, and
control the I/O interface and the voltage regulator to decouple the at least one I/O resource from, and cutoff power to, respectively, one of the first and second compute nodes based on the received operating status signals;
receive signals indicative of an operating status of at least one of the I/O interface and the voltage regulator; and
disable one of the first compute node and the second compute node based on the received operating status of the at least one of the I/O interface and the voltage regulator.

2. The apparatus of claim 1, wherein the first compute node and the second compute node have separate power pins coupled to the voltage regulator and the voltage regulator is configured such that a first portion of the power phase circuits provide power to the pins of the first compute node and a second portion of the power phase circuits provide power to the pins of the second compute node.

3. The apparatus of claim 1, wherein the first compute node further includes a first memory controller coupled to the first processor and a first memory and the second compute node further includes a second memory controller coupled to the second processor and a second memory.

4. The apparatus of claim 1, further comprising:
first I/O devices coupled to the first compute node, the first I/O devices including at least one of a first disk drive and a first network interface controller (NIC), and
second I/O devices coupled to the second compute node, the second I/O devices including at least one of a second disk drive and a second NIC.

5. An apparatus, comprising:
a first compute node including a first processor;
a second compute node including a second processor;
an input/output (I/O) interface to selectively couple the first and second compute nodes to a set of I/O resources;
a voltage regulator including a set of power phase circuits, the voltage regulator to operate in a fault tolerant mode to provide power from selected ones of a first portion of the set of power phase circuits to the first compute node and to provide power from selected ones of a second portion of the set of power phase circuits to the second compute node; and
a controller to:
receive signals indicative of an operating status of the first and second compute nodes, and
control the voltage regulator to cutoff power to one of the first and second compute nodes based on the received operating status signals.

6. The apparatus of claim 5, wherein the controller is to cause the I/O interface to decouple the set of I/O resources from one of the first and second compute nodes based on the received operating status signals.

7. The apparatus of claim 5, wherein the controller is to:
receive signals indicative of an operating status of at least one of the I/O interface and the voltage regulator; and
disable one of the first compute node and the second compute node based on the received operating status of the at least one of the I/O interface and the voltage regulator.

8. The apparatus of claim 5, wherein the voltage regulator is to operate in a normal mode to provide power from selected ones of the entire set of power phase circuits to both the first and second compute nodes.

9. A method, comprising:
receiving signals indicative of operating status of a first compute node and a second compute node of a multi-node component, the first compute node comprising a first processor and the second compute node comprising a second processor; and
based on the received operating status signals, controlling at least one of a voltage regulator to cutoff power supplied to one of the first and second compute nodes, and an I/O interface to decouple at least one I/O resource from one of the first and second compute nodes,
receiving signals indicative of an operating status of the I/O interface; and
based on the received operating status signals of the I/O interface, disabling one of the first and second compute nodes
wherein:
the input/output (I/O) interface is to selectively couple the first compute node and the second compute node to the at least one I/O resource, and
the voltage regulator is to selectively provide power to the first compute node and the second compute node with a plurality of power phase circuits.

10. The method of claim 9, further comprising:
receiving signals indicative of an operating status of the voltage regulator; and
based on the received operating status signals of the voltage regulator, disabling one of the first and second compute nodes.

11. The method of claim 10, further comprising:
based on the received operating status signals of the voltage regulator, controlling the I/O interface to decouple at least one I/O resource from the one of the first and second compute nodes.

12. The method of claim 9, further comprising:
based on the received operating status signals of the I/O interface, controlling the voltage regulator to cutoff power supplied to one of the first and second compute nodes.

13. An apparatus, comprising:
a first compute node including a first processor, a first memory controller coupled to the first processor, and a first memory;
a second compute node including a second processor, a second memory controller coupled to the second processor, and a second memory;
an input/output (I/O) interface to selectively couple the first compute node and the second compute node to at least one I/O resource;
a voltage regulator including a plurality of power phase circuits to selectively provide power to the first compute node and the second compute node; and
a controller to:
receive signals indicative of an operating status of the first and second compute nodes, and
control the I/O interface and the voltage regulator to decouple the at least one I/O resource from, and cutoff power to, respectively, one of the first and second compute nodes based on the received operating status signals.

14. The apparatus of claim 13, wherein the first compute node and the second compute node have separate power pins coupled to the voltage regulator and the voltage regulator is configured such that a first portion of the power phase circuits provide power to the pins of the first compute node and a second portion of the power phase circuits provide power to the pins of the second compute node.

15. The apparatus of claim 13, wherein the controller is to:
receive signals indicative of an operating status of at least one of the I/O interface and the voltage regulator; and
disable one of the first compute node and the second compute node based on the received operating status of the at least one of the I/O interface and the voltage regulator.

16. The apparatus of claim 13, further comprising:
first I/O devices coupled to the first compute node, the first I/O devices including at least one of a first disk drive and a first network interface controller (NIC), and
second I/O devices coupled to the second compute node, the second I/O devices including at least one of a second disk drive and a second NIC.

* * * * *